(12) United States Patent
Kim

(10) Patent No.: US 8,260,364 B2
(45) Date of Patent: Sep. 4, 2012

(54) MOBILE COMMUNICATION TERMINAL AND SCREEN SCROLLING METHOD THEREOF FOR PROJECTING DISPLAY INFORMATION

(75) Inventor: Jong Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 415 days.

(21) Appl. No.: 12/556,428

(22) Filed: Sep. 9, 2009

(65) Prior Publication Data

US 2010/0099464 A1    Apr. 22, 2010

(30) Foreign Application Priority Data

Oct. 22, 2008  (KR) .......................... 10-2008-0103697

(51) Int. Cl.
*H04B 1/38* (2006.01)
(52) U.S. Cl. ...................... 455/566; 455/158.4; 455/557; 345/1.1; 345/2.2; 345/3.4
(58) Field of Classification Search .................. None
See application file for complete search history.

(56) References Cited

U.S. PATENT DOCUMENTS

| | | | |
|---|---|---|---|
| 6,753,907 B1 * | 6/2004 | Sukthankar et al. ....... 348/222.1 |
| 2003/0095155 A1 | 5/2003 | Johnson | |
| 2005/0041216 A1 * | 2/2005 | Kobayashi ...................... 353/69 |
| 2007/0229650 A1 | 10/2007 | McKay | |
| 2008/0189650 A1 * | 8/2008 | Scott et al. .................... 715/784 |
| 2009/0036158 A1 * | 2/2009 | Fujinawa et al. .......... 455/556.1 |
| 2009/0144661 A1 * | 6/2009 | Nakajima et al. ............. 715/835 |

FOREIGN PATENT DOCUMENTS

EP    1 924 090 A1    5/2008
WO    WO2007/029805    *    3/2007

* cited by examiner

*Primary Examiner* — Rafael Pérez-Gutiérrez
*Assistant Examiner* — Keith Fang
(74) *Attorney, Agent, or Firm* — Birch, Stewart, Kolasch & Birch, LLP

(57) ABSTRACT

A method of controlling a mobile communication terminal, and which includes projecting display information via a projector module onto an external surface; detecting, via a sensor included in the terminal, a motion of the mobile communication terminal; calculating, via a controller, an amount of the detected motion of the mobile communication terminal; and moving, via the controller controlling the projector module, the display information projected onto the external surface based on the calculated amount of the detected motion.

18 Claims, 20 Drawing Sheets

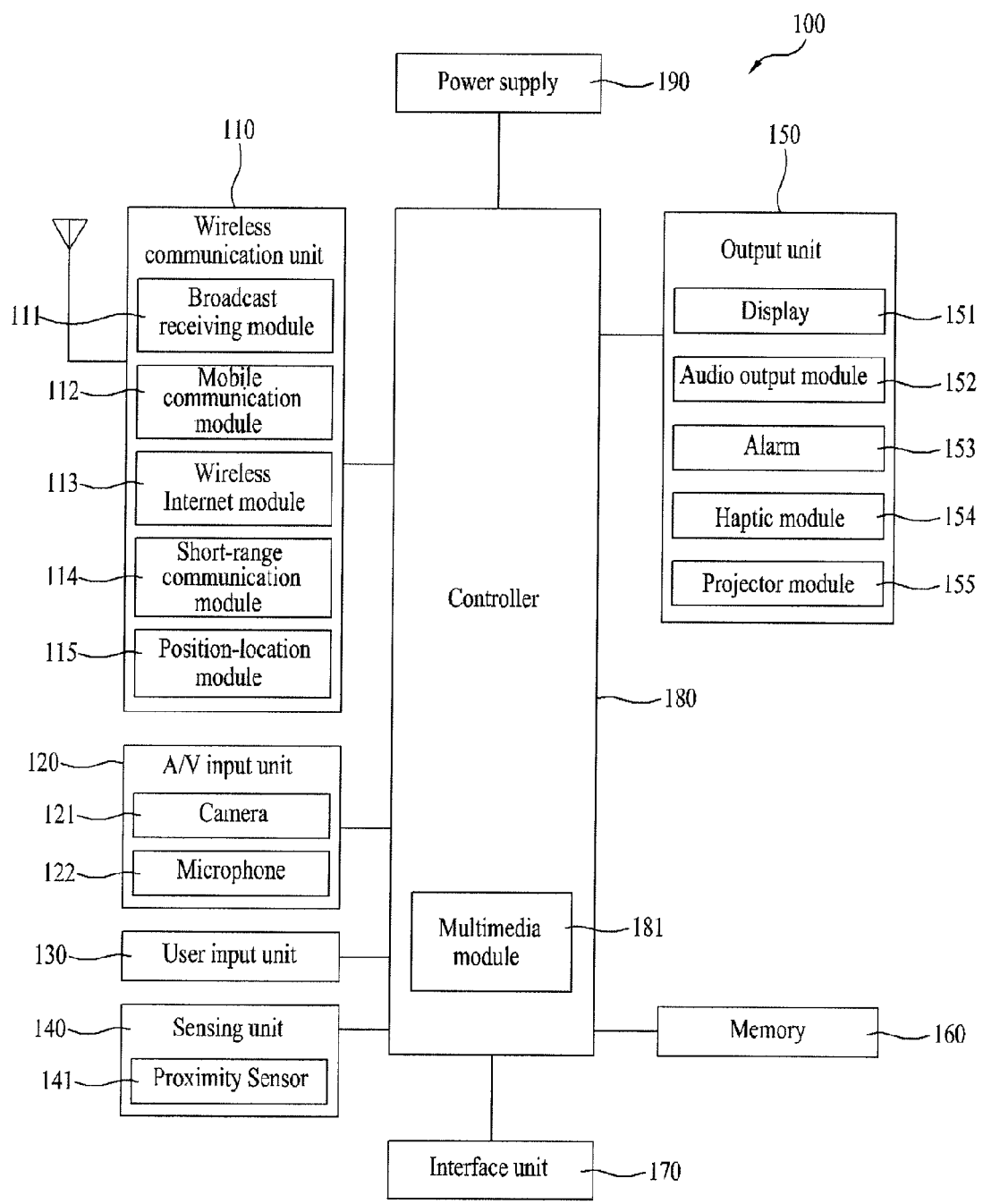

FIG. 7B
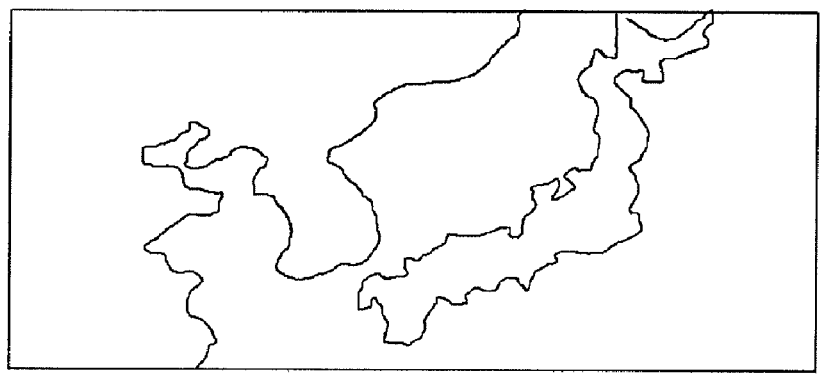
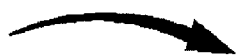
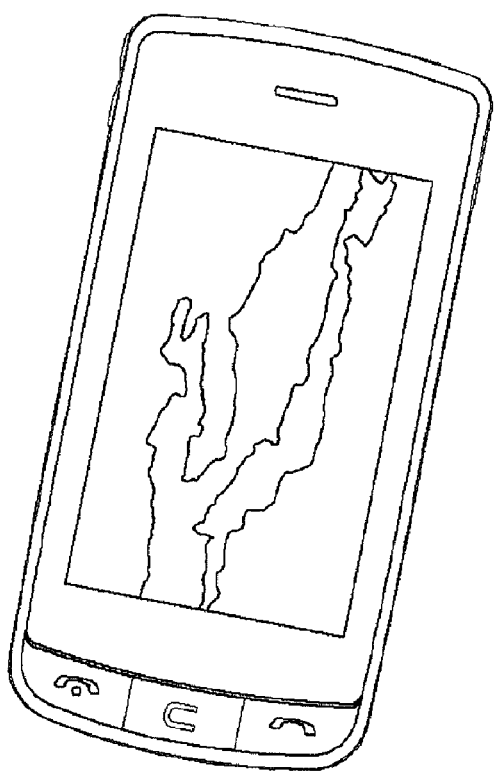

MOBILE COMMUNICATION TERMINAL AND SCREEN SCROLLING METHOD THEREOF FOR PROJECTING DISPLAY INFORMATION

Pursuant to 35 U.S.C. §119(a), this application claims the benefit of earlier filing date and right of priority to Korean Application No. 10-2008-0103697, filed on Oct. 22, 2008, the contents of which are hereby incorporated by reference herein in their entirety.

BACKGROUND OF THE INVENTION

1. Field of the Invention

The present invention relates to a mobile communication terminal and corresponding method for scrolling a screen of a mobile communication terminal having a projector module.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players.

However, because the mobile terminals are generally carried by someone, the terminal is small in size. Thus, the amount of display area is also significantly reduced.

SUMMARY OF THE INVENTION

Accordingly, one object of the present invention is to address the above-noted and other problems.

Another object of the present invention is to provide a mobile communication terminal and corresponding method for scrolling a projected image when the terminal is moved by the user.

Yet another object of the present invention is to provide a mobile communication terminal and corresponding method for smoothly moving a projected image based on a detected motion of the terminal.

To achieve these objects and other advantages and in accordance with the purpose of the invention, as embodied and broadly described herein, the present invention provides in one aspect a method of controlling a mobile communication terminal, and which includes projecting display information via a projector module onto an external surface; detecting, via a sensor included in the terminal, a motion of the mobile communication terminal; calculating, via a controller, an amount of the detected motion of the mobile communication terminal; and moving, via the controller controlling the projector module, the display information projected onto the external surface based on the calculated amount of the detected motion.

In another aspect, the present invention provides a mobile communication terminal including a projector module configured to project display information onto an external surface, a sensor configured to detect a motion of the mobile communication terminal, and a controller configured to calculate an amount of the detected motion of the mobile communication terminal, and to control the projector module to move the display information projected onto the external surface based on the calculated amount of the detected motion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a block diagram of a mobile terminal according to one embodiment of the present invention;

FIGS. 7A to 7F are diagrams illustrating a screen scroll operation in a mobile communication terminal according to an embodiment of the present invention;

DETAILED DESCRIPTION OF THE INVENTION

Figure 2A:
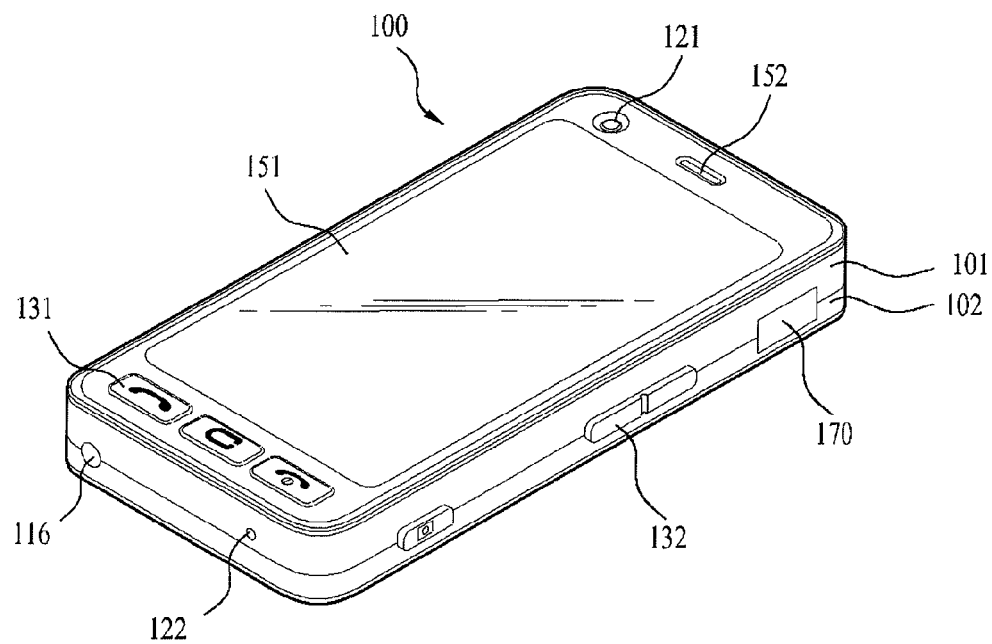
FIG. 2A is a front perspective diagram of a mobile terminal according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. Further, the mobile terminal described in the specification can include a cellular phone, a smart phone, a laptop computer, a digital broadcasting terminal, personal digital assistants (PDA), a portable multimedia player (PMP), a navigation system and so on.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190. Not all of the components shown in FIG. 1 are essential parts and the number of components included in the mobile terminal can be varied.

In addition, the radio communication unit 110 includes at least one module that enables radio communication between the mobile terminal 100 and a radio communication system or between the mobile terminal 100 and a network in which the mobile terminal 100 is located. For example, in FIG. 1, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Further, the broadcasting channel can include a satellite channel and a terrestrial channel. Also, the broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals, but also signals in the form of a combination of a TV broadcasting signal and a radio broadcasting signal.

In addition, the broadcasting related information can be information on a broadcasting channel, a broadcasting program or a broadcasting service provider. The broadcasting related information can be provided even through a mobile communication network. In this instance, the broadcasting related information can be received by the mobile communication module 112. The broadcasting related information can also exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. In particular, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, and the DVB-H and integrated services digital broadcast-terrestrial (ISDB-T) system. The broadcasting receiving module 111 can also be constructed to be suited to broadcasting systems providing broadcasting signals other than the above-described digital broadcasting systems. The broadcasting signals and/or broadcasting related information received through the broadcasting receiving module 111 can also be stored in the memory 160.

Further, the mobile communication module 112 transmits/receives a radio signal to/from at least one of a base station, an external terminal, and a server on a mobile communication network. The radio signal can include a voice call signal, a video telephony call signal or data in various forms according to transmission and receiving of text/multimedia messages. The wireless Internet module 113 corresponds to a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique. The local area communication module 114 corresponds to a module for local area communication. Bluetooth, radio frequency identification (RFID), infrared data association (IrDA), ultra wideband (UWB) and ZigBee can be used as a local area communication technique.

In addition, the position information module 115 confirms or obtains the position of the mobile terminal 100. A global positioning system (GPS) module is a representative example of the position information module 115. Further, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude coordinates at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. The processed image frames can be displayed on a display 151 included in the output unit 150. In addition, the image frames processed by the camera 121 can be stored in the memory 160 or transmitted to an external device through the radio communication unit 110. The mobile terminal 100 can also include at least two cameras according to constitution of the terminal.

Further, the microphone 122 receives an external audio signal in a call mode, a recording mode or a speed recognition mode and processes the received audio signal into electric audio data. The audio data can also be converted into a form that can be transmitted to a mobile communication base station through the mobile communication module 112 and output in the call mode. The microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on. The sensing unit 140 senses the current state of the mobile terminal 100, such as an open/close state of the mobile terminal 100, the position of the mobile terminal 100, whether a user touches the mobile terminal 100, the direction of the mobile terminal 100 and acceleration/deceleration of the mobile terminal 100 and generates a detection signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor 141.

In addition, the output unit 150 generates visual, auditory or tactile output and in FIG. 1 includes the display 151, an audio output module 152, an alarm 153, a haptic module 154, and a projector module 155. The display 151 displays information processed by the mobile terminal 100. For example, the display 151 displays a UI or graphic user interface (GUI) related to a telephone call when the mobile terminal is in the call mode. The display 151 also displays a captured or/and received image, UI or GUI when the mobile terminal 100 is in the video telephony mode or the photographing mode.

The display 151 can also include at least one of a liquid crystal display, a thin film transistor liquid crystal display, an organic light-emitting diode display, a flexible display and a three-dimensional display. Some of these displays can be of a transparent type or a light transmission type, which is referred to as a transparent display. The transparent display also includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display 151.

Further, the mobile terminal 100 can include at least two displays 151 according to constitution of the terminal. For example, the mobile terminal 100 can include a plurality of displays that are arranged on a single face at a predetermined distance or integrated. Otherwise, the plurality of displays can be arranged on different sides. In addition, when the display 151 and a sensor sensing touch (referred to as a touch sensor hereinafter) form a layered structure, which is referred to as a touch screen hereinafter, the display 151 can be used as an input device in addition to an output device. The touch sensor can be in the form of a touch film, a touch sheet and a touch pad, for example.

Also, the touch sensor can be constructed such that it converts a variation in pressure applied to a specific portion of the display 151 or a variation in capacitance generated at a specific portion of the display 151 into an electric input signal. The touch sensor can also be constructed such that it can sense pressure of touch as well as the position and area of touch. When touch input is applied to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal 100, surrounded by the touch screen, or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide application. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch" and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. The audio output module 152 also outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating a generation of an event of the mobile terminal 100. Examples of events generated in the mobile terminal 100 include receiving a call signal, receiving a message, inputting a key signal, inputting touch, etc. The alarm 153 can also output signals in forms different from video signals or audio signals, for example, a signal for indicating a generation of an event through vibration. The video signals or the audio signals can also be output through the display unit 151 or the audio output module 152.

In addition, the haptic module 154 generates various haptic effects that the user can feel. A representative example of the haptic effects is vibration. The intensity and pattern of vibration generated by the haptic module 154 can also be controlled. For example, different vibrations can be combined and output or sequentially output. The haptic module 154 can also generate a variety of haptic effects including an effect of stimulus according to an arrangement of pins vertically moving for a contact skin face, an effect of stimulus according to a jet force or sucking force of air through a jet hole or a sucking hole, an effect of stimulus of rubbing the skin, an effect of stimulus according to contact of an electrode, an effect of stimulus using an electrostatic force and an effect according to reproduction of cold and warmth using an element capable of absorbing or radiating heat in addition to vibrations. Further, the haptic module 154 can not only transmit haptic effects through direct contact but also allow the user to feel haptic effects through kinesthetic sense of his or her fingers or arms. The mobile terminal 100 can also include at least two or more haptic modules 154 according to constitution of the mobile terminal.

The projector module 155 is an element for performing an image projector function using the mobile terminal 100. That is, the projector module 155 can display an image, which is identical to or partially different at least from the image displayed on the display 151, on an external surface such as a wall or screen according to a control signal of the controller 180. In particular, the projector module 155 includes a light source generating light (e.g., laser) for projecting an image, an image producing unit for producing an image to be projected using the light generated from the light source, and a lens for enlarging the image to be projected in a predetermined focus distance. In addition, the projector module 155 can include an adjustment device for adjusting an image projected direction by mechanically moving the lens or the whole module.

Further, the projector module 155 can be classified into a CRT (cathode ray tube) module, an LCD (liquid crystal display) module, a DLP (digital light processing) module or the like according to a device type of a display mechanism. In particular, the DLP module is operated by the mechanism of enabling the light generated from the light source to reflect on a DMD (digital micro-mirror device) chip and can be advantageous for the downsizing of the projector module 151. Preferably, the projector module 155 can be provided in a length direction of a lateral, front or backside direction of the mobile terminal 100. The projector module 155 can also be provided to any portion of the mobile terminal 100.

In addition, the memory 160 stores a program for the operation of the controller 180 and temporarily stores input/output data (for example, phone book, messages, still images, moving images, etc.). The memory 160 can also store data about vibrations and sounds in various patterns, which are output when a touch input is applied to the touch screen. The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

Further, the interface 170 serves as a path to all external devices connected to the mobile terminal 100. The interface 170 receives data or power from the external devices and transmits the data or power to the internal components of the mobile terminal 100 or transmits data of the mobile terminal 100 to the external devices. The interface 170 can also include a wired/wireless headset port, an external charger port, a wired/wireless data port, a memory card port, a port for connecting a device having a user identification module, an audio I/O port, a video I/O port, an earphone port, etc., for example.

In addition, an identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

Also, the interface 170 can serve as a path through which power from an external cradle is provided to the mobile terminal 100 when the mobile terminal 100 is connected to the external cradle or a path through which various command signals input by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. In FIG. 1, the controller 180 includes a multimedia module 181 for playing multimedia. The multimedia module 181 can be included in the controller 180 or separated from the controller 180. Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Further, various embodiments of the present invention can be implemented in a computer or similar device readable recording medium using software, hardware or a combination thereof, for example. According to a hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. The embodiments can also be implemented by the controller 180.

According to a software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Next, FIG. 2A is a front perspective view of a mobile terminal or a handheld terminal 100 according to an embodiment of the present invention. As shown, the mobile terminal 100 is a bar type terminal body. However, the present invention is not limited to a bar type terminal and can be applied to terminals of various types including a slide type, folder type, swing type and swivel type terminals having at least two bodies that are relatively movably combined.

In addition, the terminal body includes a case (a casing, a housing, a cover, etc.) forming the exterior of the terminal 100. In the present embodiment, the case is divided into a front case 101 and a rear case 102. Various electronic components are also arranged in the space formed between the front case 101 and the rear case 102. At least one middle case can be additionally arranged between the front case 101 and the rear case 102. The cases can also be formed of plastics through injection molding or be made of a metal material such as stainless steel (STS) or titanium (Ti).

In addition, the display 151, the audio output unit 152, the camera 121, user input units 131 and 132 of the user input unit 130 (FIG. 1), the microphone 122 and the interface 170 are arranged in the terminal body, specifically, in the front case 101. Also, the display 151 occupies most part of the main face of the front case 101. The audio output unit 152 and the camera 121 are arranged in a region in proximity to one of both ends of the display 151 and the user input unit 131 and the microphone 122 are located in a region in proximity to the other end of the display 151. In addition, the user input unit 132 and the interface 170 are arranged on the sides of the front case 101 and the rear case 102.

Further, the user input unit 130 is operated to receive commands for controlling the operation of the handheld terminal 100 and can include the operating units 131 and 132. The operating units 131 and 132 can be referred to as manipulating portions and employ any tactile manner in which a user operates the operating units 131 and 132 while having tactile feeling. The operating units 131 and 132 can also receive various inputs. For example, the operating unit 131 receives commands such as start, end and scroll, and the second operating unit 132 receives commands such as control of the volume of sound output from the audio output unit 152 or conversion of the display 151 to a touch recognition mode.

Figure 2B:
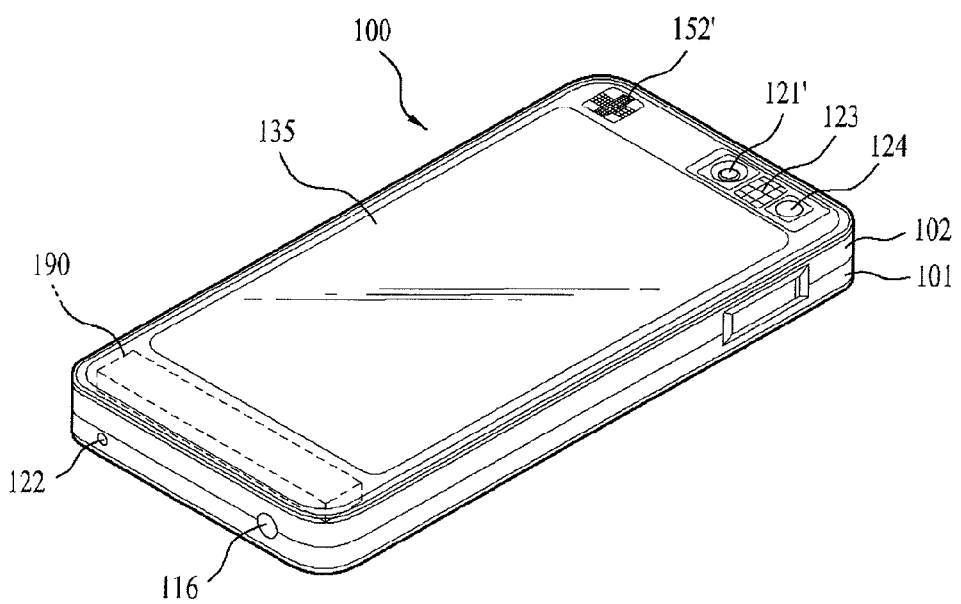
FIG. 2B is a rear perspective diagram of a mobile terminal according to one embodiment of the present invention.

Next, FIG. 2B is a rear perspective view of the mobile terminal 100 shown in FIG. 2A according to an embodiment of the present invention. Referring to FIG. 2B, a camera 121' is additionally attached to the rear side of the terminal body, that is, the rear case 102. The camera 121' has a photographing direction opposite to that of the camera 121 shown in FIG. 2A and can have pixels different from those of the camera 121 shown in FIG. 2A. For example, it is preferable that the camera 121 has low pixels such that it can capture an image of the face of a user and transmit the image to a receiving part for video telephony, while the camera 121' has high pixels because it captures an image of a general object and does not immediately transmit the image in many instances. The cameras 121 and 121' can also be attached to the terminal body such that they can be rotated or pop-up.

A flash bulb 123 and a mirror 124 are also arranged in proximity to the camera 121'. The flash bulb 123 lights an object when the camera 121' takes a picture of the object, and the mirror 124 is used for the user to look at his/her face in the mirror when the user wants to self-photograph himself/herself using the camera 121'. An audio output unit 152' is also provided on the rear side of the terminal body. The audio output unit 152' can thus achieve a stereo function with the audio output unit 152 shown in FIG. 2A and be used for a speaker phone mode when the terminal is used for a telephone call.

A broadcasting signal receiving antenna 124 is also attached to the side of the terminal body in addition to an antenna for telephone calls. The antenna 124 constructing a part of the broadcasting receiving module 111 shown in FIG. 1 can be set in the terminal body such that the antenna 124 can be retracted from the terminal body. Further, the power supply 190 for providing power to the handheld terminal 100 is set in the terminal body. The power supply 190 can be included in the terminal body or detachably attached to the terminal body. A touch pad 135 for sensing touch is also attached to the rear case 102. The touch pad 135 can be of a light transmission type as the display 151. In this instance, if the display 151 outputs visual information through both sides thereof, the visual information can be recognized through the touch pad 135. The information output through both sides of the display 151 can also be controlled by the touch pad 135. Otherwise, a display is additionally attached to the touch pad 135 such that a touch screen can be arranged even in the rear case 102.

The touch pad 135 also operates in connection with the display 151 of the front case 101. The touch pad 135 can be located in parallel with the display 151 behind the display 151, and can be identical to or smaller than the display 151 in size. Interoperations of the display 151 and the touch pad 135 will now be described with reference to FIGS. 3A and 3B.

Figure 3A:
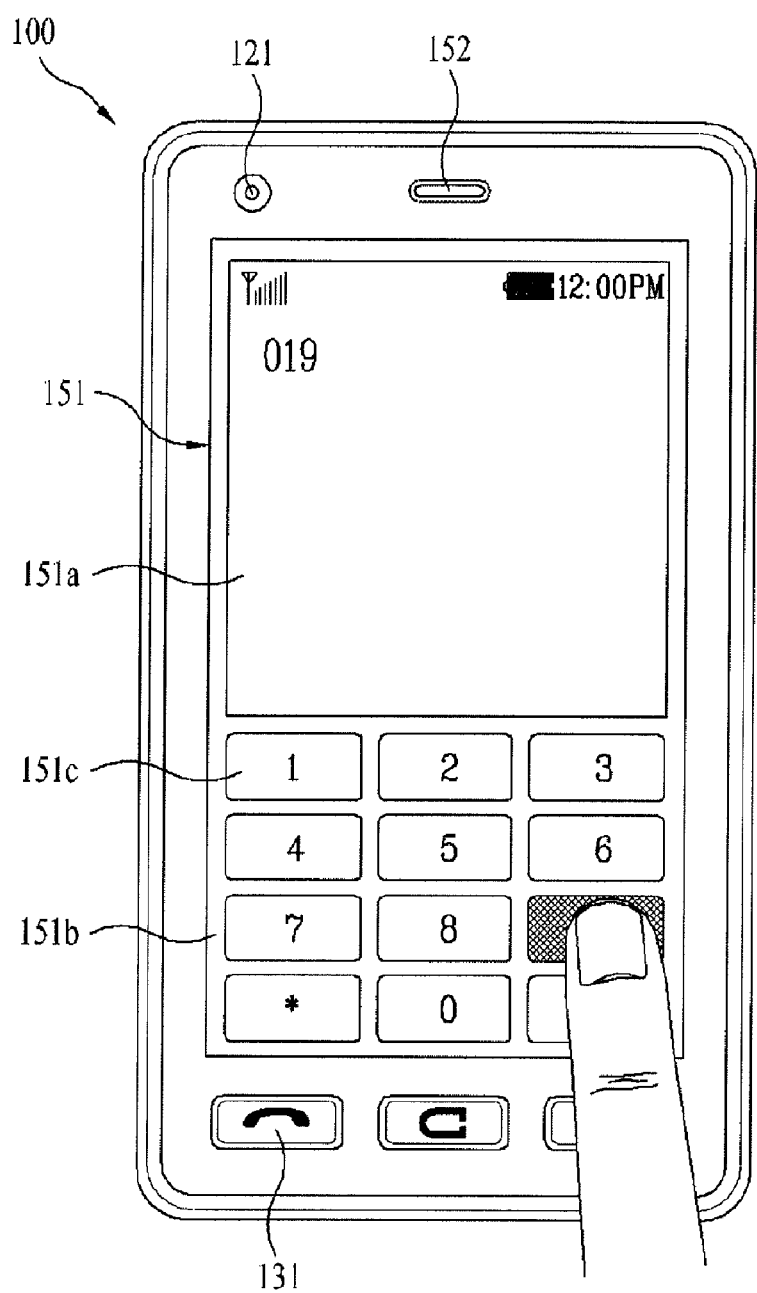
FIGS. 3A and 3B are front diagrams of a mobile terminal for explaining one operational status of the mobile terminal according to one embodiment of the present invention.
Figure 3B:
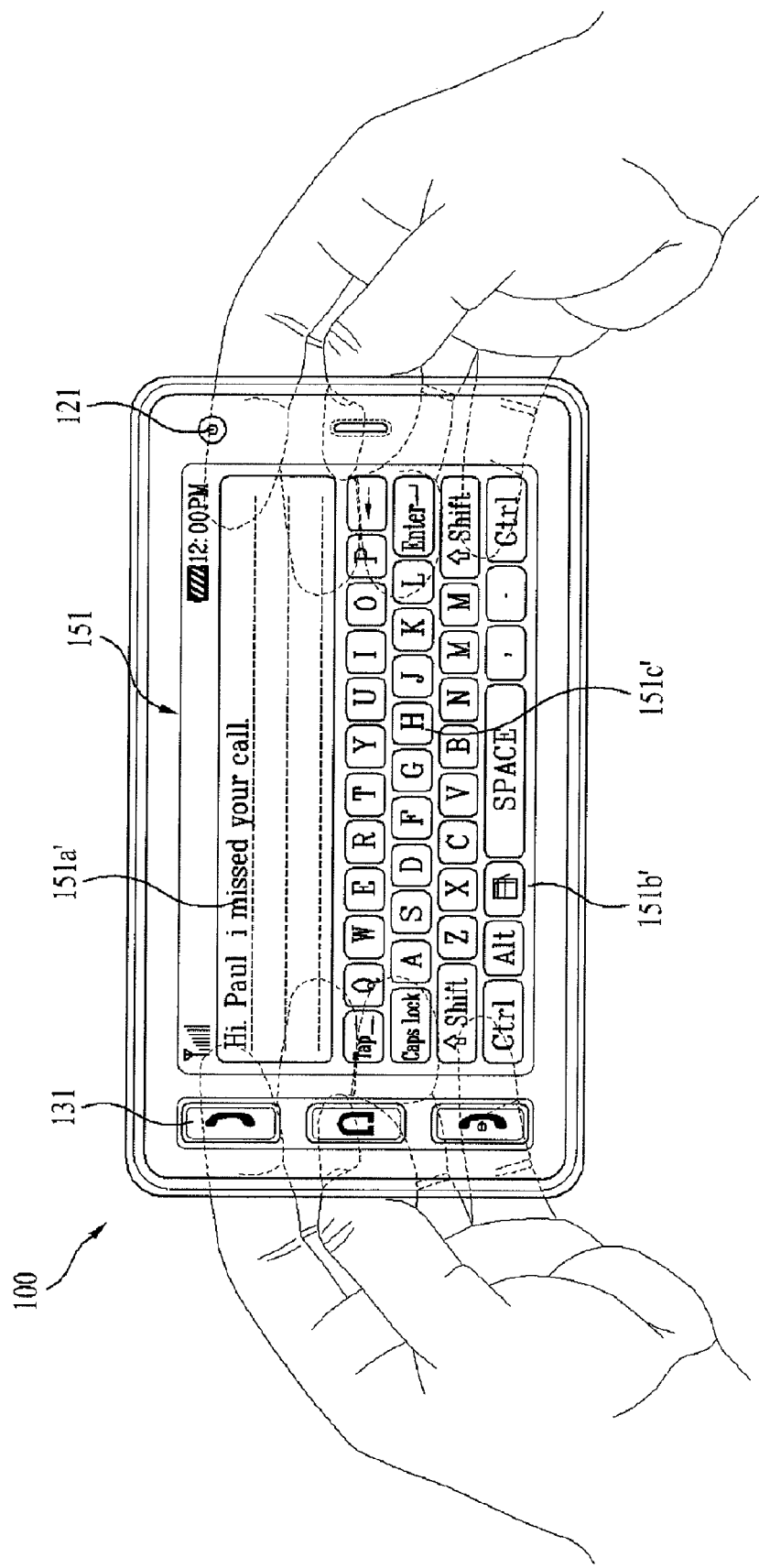

In more detail, FIGS. 3A and 3B are front views of the mobile terminal 100 for explaining an operating state of the handheld terminal according to an embodiment of the present invention. In addition, the display 151 can display various types of visual information in the form of characters, numerals, symbols, graphic or icons. To input the information, at least one of the characters, numerals, symbols, graphic and icons are displayed in predetermined arrangement in the form of a keypad. This keypad can be referred to as a 'soft key' key pad.

Further, FIG. 3A shows that touch applied to a soft key is input through the front side of the terminal body. The display 151 can also be operated through the overall area. Otherwise, the display 151 can be divided into a plurality of regions and operated. In the latter instance, the display 151 can be constructed such that the plurality of regions interoperate. For example, an output window 151*a* and an input window 151*b* are respectively displayed in upper and lower parts of the display 151. The input window 151*b* displays soft keys 151*c* that represent numerals used to input numbers such as telephone numbers. When a soft key 151*c* is touched, a numeral corresponding to the touched soft key is displayed on the output window 151*a*. When the user operates a first operating unit 116, the controller 180 attempts to connect a call corresponding to a telephone number displayed on the output window 151*a*.

Next, FIG. 3B shows that touch applied to soft keys is input through the rear side of the terminal body. FIG. 3B also shows the landscape of the terminal body, while FIG. 3A shows the portrait of the terminal body. That is, the display 151 can be constructed such that an output image is converted according to the direction in which the terminal body is located. Further, FIG. 3B shows the operation of the mobile terminal 100 in a text input mode. As shown, the display 151 displays an output window 135*a* and an input window 135*b*. A plurality of soft keys 135*c* indicating at least one of characters, symbols and numerals are arranged in the input window 135*b*. The soft keys 135*c* can also be arranged in the form of QWERTY keys.

When the soft keys 135*c* are touched through the touch pad 135, characters, numerals and symbols corresponding to the touched soft keys 135*c* are displayed on the output window 135*a*. Touch input through the touch pad 135 can prevent the soft keys 135*c* from being covered with the user's fingers when the soft keys 135*c* are touched as compared to touch input through the display 151. When the display 151 and the touch pad 135 are transparent, fingers located behind the terminal body can be seen by the user, and thus touch input can be performed more accurately.

In addition, the display 151 or the touch pad 135 can be constructed such that it receives touch input in a scroll manner. That is, the user can scroll the display 151 or the touch pad 135 to move an object displayed on the display 151, for example, a cursor or a pointer located on an icon. Furthermore, when the user moves his or her finger on the display 151 or the touch pad 135, the finger moving path can be visually displayed on the display 151. This will be useful to edit an image displayed on the display 151.

Also, when the display unit 151 (touch screen) and the touch pad 135 are simultaneously touched in a predetermined period of time, a specific function of the terminal can be executed. This action can include when the user clamps the terminal body using the thumb and the index finger. The specific function can include activation or inactivation of the display 151 or the touch pad 135, for example.

Figure 4:
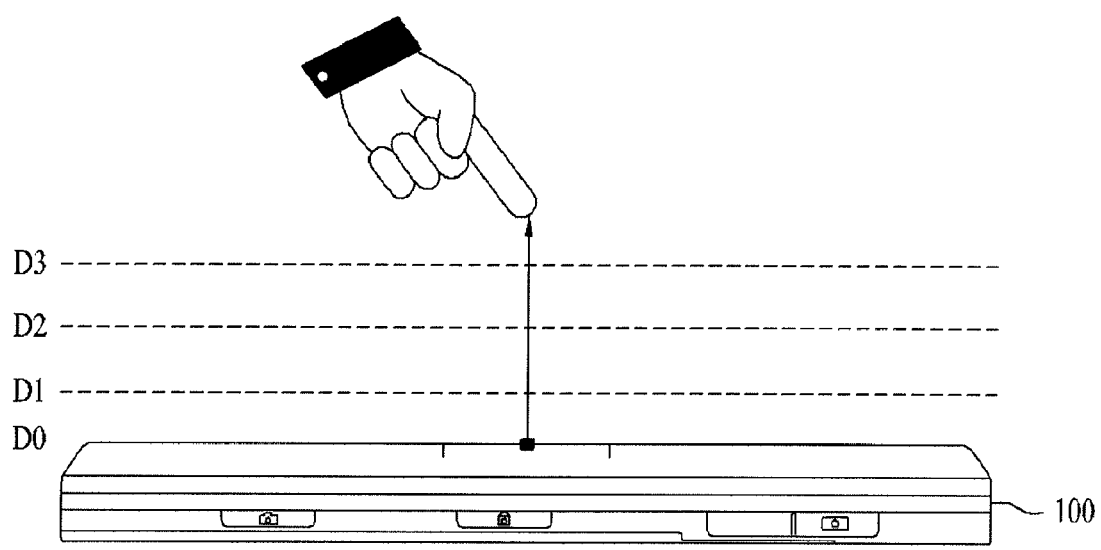
FIG. 4 is a diagram for explaining a concept of proximity depth of a proximity sensor.

The proximity sensor 141 described with reference to FIG. 1 will now be explained in more detail with reference to FIG. 4. That is, FIG. 4 is a conceptional view for explaining a proximity depth of the proximity sensor 141. As shown in FIG. 4, when a pointer such as a user's finger approaches the touch screen, the proximity sensor 141 located inside or near the touch screen senses the approach and outputs a proximity signal. In addition, the proximity sensor 141 can be constructed such that it outputs a proximity signal according to the distance between the pointer approaching the touch screen and the touch screen (referred to as "proximity depth"). The distance in which the proximity signal is output when the pointer approaches the touch screen is referred to as a detection distance. The proximity depth can be known by using a plurality of proximity sensors having different detection distances and comparing proximity signals respectively output from the proximity sensors.

Further, FIG. 4 shows the section of the touch screen in which proximity sensors capable of sensing three proximity depths are arranged. Proximity sensors capable of sensing less than three or more than four proximity depths can be arranged in the touch screen. Specifically, when the pointer completely comes into contact with the touch screen (D0), it is recognized as contact touch. When the pointer is located within a distance D1 from the touch screen, it is recognized as proximity touch of a first proximity depth, and when the pointer is located in a range between the distance D1 and a distance D2 from the touch screen, it is recognized as proximity touch of a second proximity depth. Further, when the pointer is located in a range between the distance D2 and a distance D3 from the touch screen, it is recognized as proximity touch of a third proximity depth, and when the pointer is located at longer than the distance D3 from the touch screen, it is recognized as cancellation of the proximity touch.

Accordingly, the controller 180 can recognize the proximity touch as various input signals according to the proximity distance and proximity position of the pointer with respect to the touch screen and perform various operation controls according to the input signals.

Embodiments of the present invention will now be explained in more detail. The embodiments also refer to the display 151 as a touch screen. A touch also includes both a proximity touch and a direct touch in the following description. Furthermore, touch input includes every possible touch according to variations in the number of touches, duration, behavior and form of a touch, such as various input signals corresponding to touch variations, for example, touch down, touch up, a lapse of predetermined touch duration, drag and drop, etc.

Figure 5:
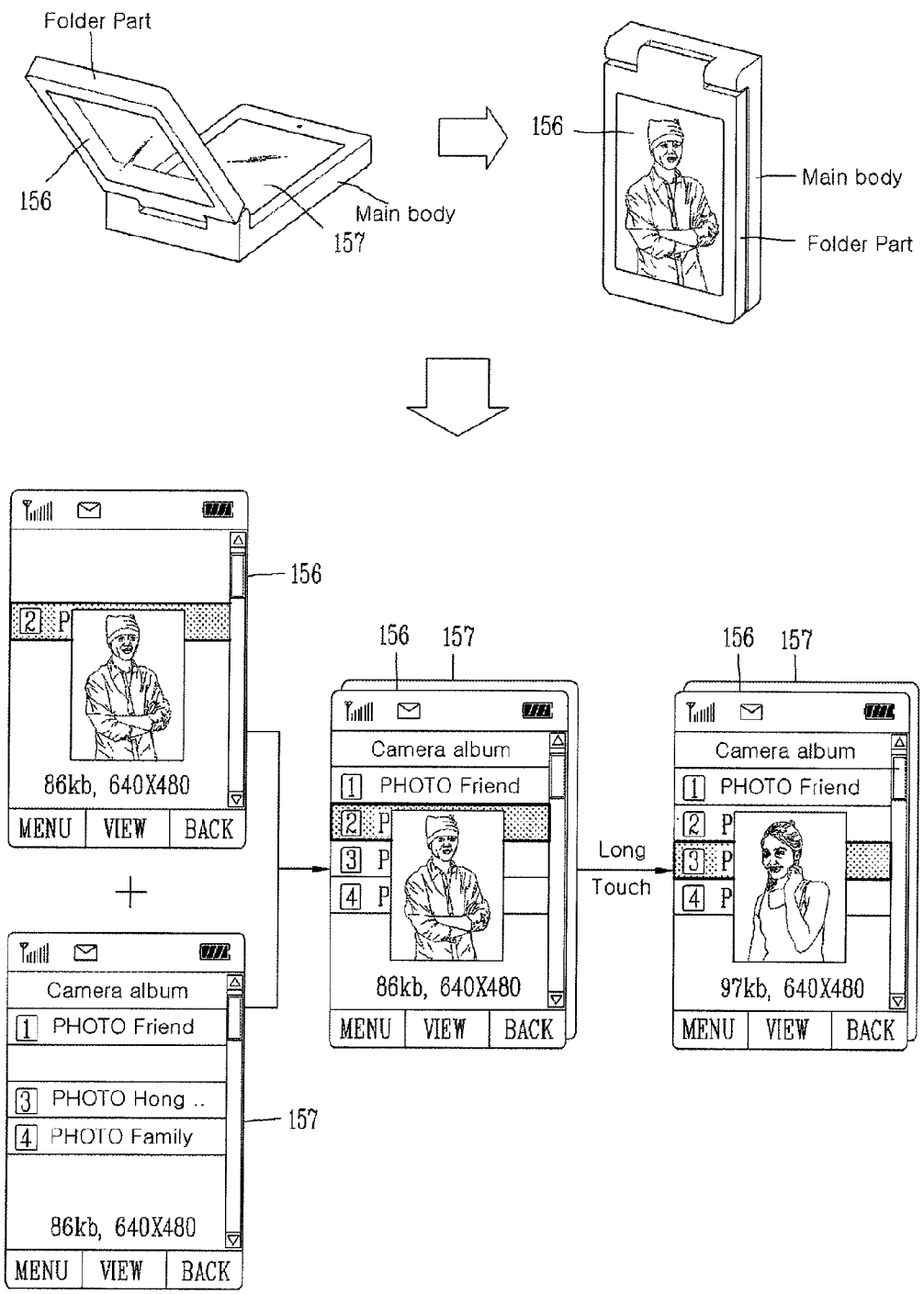
FIG. 5 is a diagram for explaining a method of controlling a touch action on a pair of display units overlapped with each other.

Next, FIG. 5 is a conceptual diagram for exampling a method of controlling a touch action when a pair of displays 156 and 157 are overlapped with each other. The terminal shown in FIG. 5 is a folder type terminal in which a folder part is connected to a main body. The folder part can then be folded or unfolded with respect to the main part. Further, the first display 156 provided to the folder part is a light-transmittive or transparent type such as TOLED, while the second display 157 provided to the main body may be a non-transmittive type such as an LCD. Each of the first and second display 156 and 157 can also include a touchscreen. For instance, if a touch (contact touch or proximity touch) to the first display or TOLED 156 is detected, the controller 180 selects or executes at least one image from an image list displayed on the TOLED 156 according to a touch type and a touch duration.

The following description refers to a method of controlling information displayed on the two displays 156 and 157. In addition, the description refers input types such as a touch, a long touch, a long-touch & drag and the like. As shown in FIG. 5, in the overlapped state (a state that the mobile terminal is closed or folded), the TOLED 156 is configured to be overlapped with the LCD 157. In this state, if a touch different from a touch for controlling an image displayed on the TOLED 156, e.g., a long touch (e.g., a touch having a duration of at least 2 seconds) is detected, the controller 180 enables at least one image to be selected from an image list displayed on the LCD 157 according to the touched touch input. The result from executing the selected image is displayed on the TOLED 156.

In addition, the user can also use the long touch input operation to selectively shift a specific one of the entities displayed on the LCD 157 to the TOLED 156 (without an action for executing the corresponding entity). In particular, if a user performs a long touch on a prescribed region of the TOLED 156 corresponding to a specific entity of the LCD 157, the controller 180 controls the corresponding entity to be displayed by being shifted to the TOLED 156. Meanwhile, an entity displayed on the TOLED 156 can be displayed by being shifted to the LCD 157 according to such a prescribed touch input to the TOLED 156 as flicking, swirling and the like. FIG. 5 illustrates a second menu displayed on the LCD 157 by being shifted to the TOLED 156.

Also, when another input (e.g., a dragging operation) is additionally detected together with the long touch input operation, the controller 180 executes a function associated with an image selected by the long touch operation so that a preview picture for the image can be displayed on the TOLED 156, for example. FIG. 5 illustrates a preview (picture of a male) for a second menu (image file) being performed. In addition, while the preview image is output, and if a dragging touch operation toward a different image is additionally performed on the TOLED 156 while maintaining the long touch operation, the controller 180 shifts a selection cursor (or a selection bar) of the LCD 157 and then displays the image selected by the selection cursor on the preview picture (picture of female). Thereafter, after completing the long touch and dragging operation, the controller 180 displays the initial image selected by the long touch operation.

Further, the touch action (long touch and dragging action) can also be applied when a slide action (a proximity touch operation corresponding to the dragging operation) is detected together with a long proximity touch (e.g., a proximity touch maintained for at least 2 or 3 seconds) to the TOLED 156. When a touch action differing from the above-mentioned touch actions is detected, the controller 180 operates in the same manner as a standard or predefined touch controlling method. The method of controlling the touch action in the overlapped state is also applicable to a terminal having a single display. Further, the method of controlling the touch action in the overlapped state is applicable to terminals differing from the folder type terminal having a dual display as well.

Figure 6A:
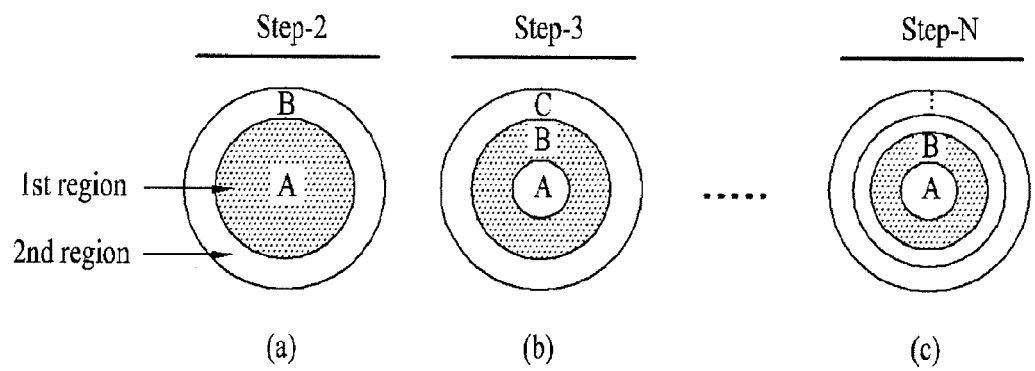
FIGS. 6A and 6B are diagrams for explaining concepts of a proximity touch recognizing area for detecting a proximity signal and a haptic area for generating a tactile effect, respectively.
Figure 6B:
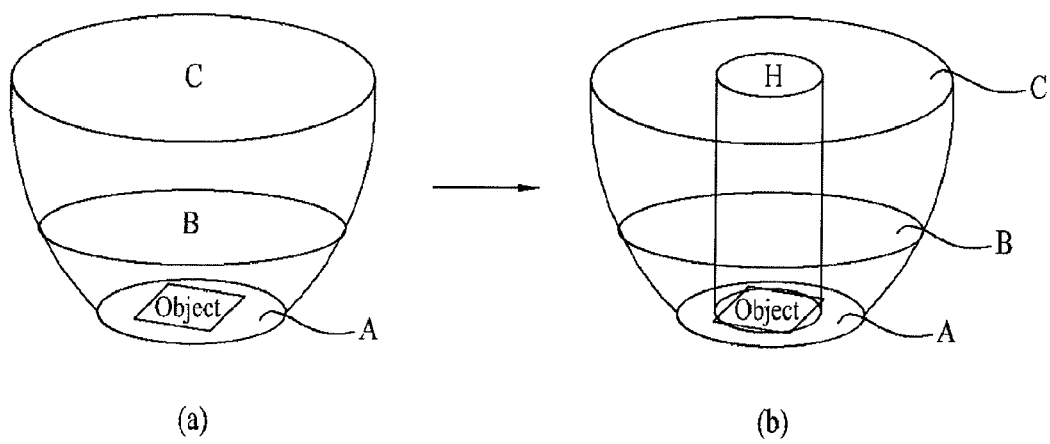

Next, FIGS. 6A and 6B are diagrams illustrating a proximity touch recognition area and a tactile effect generation region. In more detail, FIG. 6A represents an object as an icon, a menu item and the like in a circle type for clarity and convenience of explanation. As shown in FIG. 6A(a), a region for displaying an object on the display 151 can be divided into a first region A at a central part and a second region B enclosing the first region A. Further, the first and second regions A and B can be configured to generate tactile effects differing from each other in strength or pattern. For instance, the first and second regions can be configured to generate 2-step vibrations by outputting a first vibration if the second region B is touched or outputting a second vibration greater than the first vibration if the first region A is touched.

In addition, when both of the proximity touch recognition region and the haptic region are simultaneously set in the region having the object displayed therein, it is possible to set the haptic region for generating the tactile effect to be different from the proximity touch recognition region for detecting the proximity signal. In particular, it is possible to set the haptic region to be narrower or wider than the proximity touch recognition region. For instance, in FIG. 6A(a), the proximity touch recognition region can be set to the area including both of the first and second regions A and B, and the haptic region can be set to the first region A.

Further, as shown in FIG. 6A(b), the region having the object displayed therein can be discriminated into three regions A, B and C. Alternatively, the region having the object displayed therein can be discriminated into N regions (N>4) as shown in FIG. 6A(c). In addition, each of the divided regions can be set to generate a tactile effect having a different strength or pattern. Thus, when a region having a single object represented therein is divided into at least three regions, the haptic region and the proximity touch recognition region can be set to differ from each other according to a use environment.

Further, a size of the proximity touch recognition region of the display unit 151 can be set to vary according to a proximity depth. In particular, referring to FIG. 6B(a), the proximity touch recognition region decreases by C→B→A according to the proximity depth for the display 151. On the contrary, the proximity touch recognition region can also be configured to increase by C→B→A according to the proximity depth for the display unit 151. Further, the haptic region can be set to have a predetermined size, as the region 'H' shown in FIG. 6B(b) regardless of the proximity depth for the display 151. Also, when dividing the object-displayed region for the setting of the haptic region or the proximity touch recognition region, it is possible to use one of various schemes of horizontal/vertical division, radial division and combinations thereof as well as the concentric circle type division shown in FIG. 6A.

Next, FIGS. 7A to 7F are diagrams illustrating a screen scroll operation in a mobile communication terminal according to an embodiment of the present invention. As mentioned above, the mobile communication terminal according to an embodiment of the present invention includes the display 151 for displaying data and the projector module 155 for projecting data (e.g., images) onto an external surface.

Figure 7A:
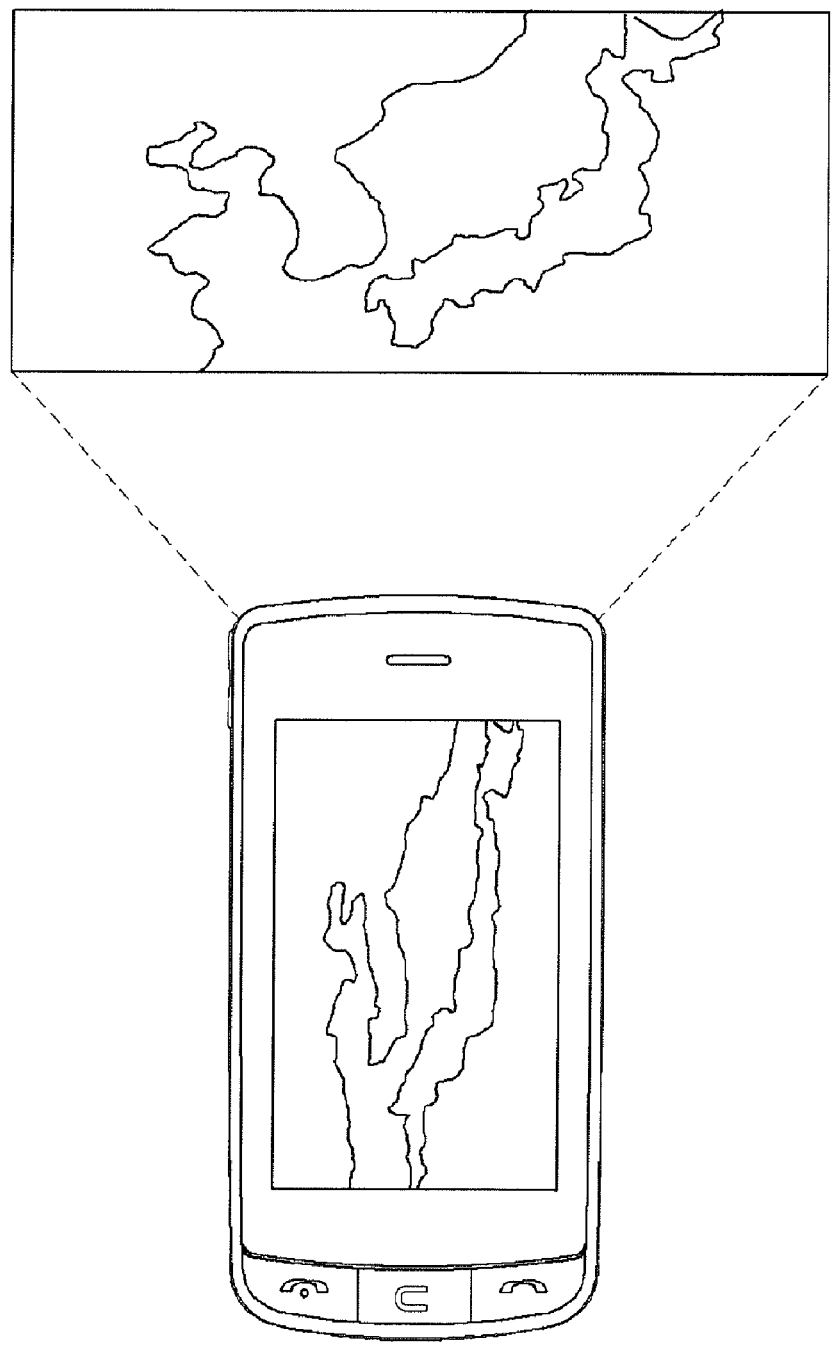

In particular, referring to FIG. 7A, a prescribed image can be projected via the projector module 155. Further, the projected data can include phone numbers, photos, moving pictures, recorded pictures, maps, etc. stored in the memory 160, data received via a short-range wireless communication, digital multimedia broadcast, etc. currently received from outside, and the like. In addition, the user can manipulate the terminal when an image is being projected via the projector module 155. For example, the user can contact or proximity touch the touchscreen of the terminal, operate an operation key provided to the terminal body, shake or move the terminal, tilt the terminal, speak into the terminal, etc. In the embodiment in FIG. 7B, the user moves, rotates or tilts the terminal.

Also, to detect the motion of a terminal, the terminal includes a motion sensor. In more detail, the motion sensor includes, for example, an inclination sensor, an acceleration sensor, a gyro sensor and the like. In particular, the motion sensor can detect all types of terminal motions including an up & down motion and a right-to-left motion in two dimensions, and/or an up & down motion, a right-to-left motion, a horizontal motion, a vertical motion and the like in three dimensions. The motion sensor can also detect a motion of the terminal by detecting a variation of a projection plane of the projector module 155 recognized by a camera provided to the terminal. In particular, the camera can determine that the terminal has moved based on the projection plane (i.e., the camera can be viewing the area of the projected image or information and determine that the projected image changes indicating the terminal has moved).

Figure 7C:
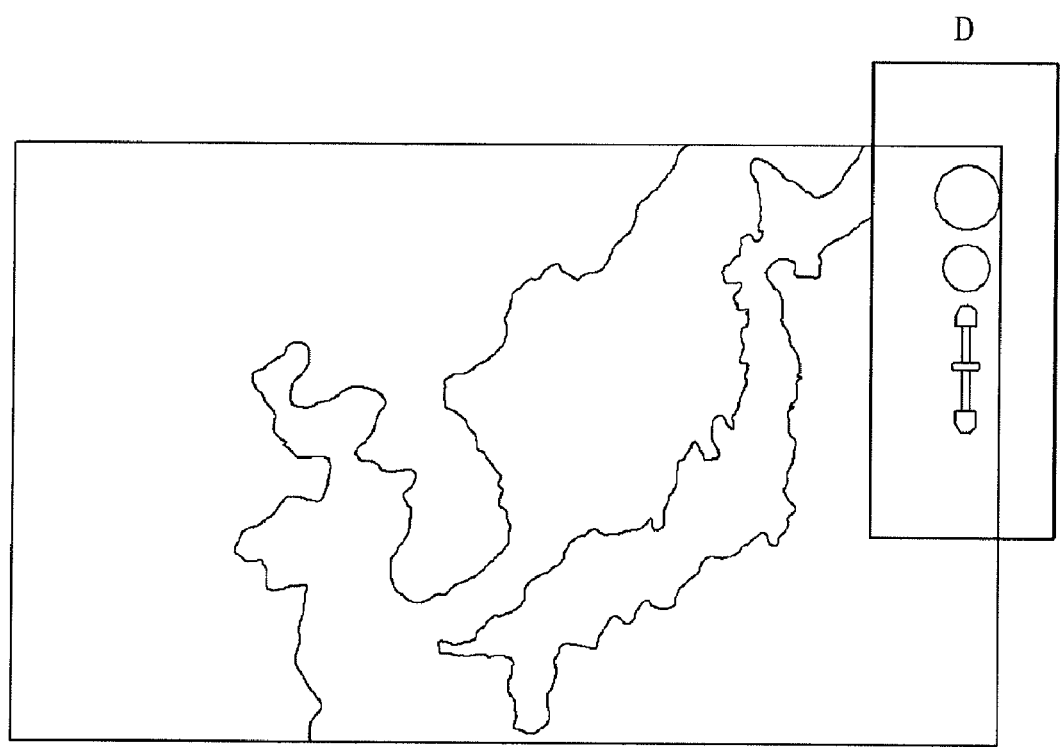

Thus, as shown in FIG. 7C, when the motion sensor detects a motion of the terminal, the controller 180 controls the display 151 to display a display area scroll icon D on a prescribed portion of the display screen. Further, the display area scroll icon D is displayed on both of the display 151 provided to the terminal body and the projection plane (e.g., on the projected image in a similar corresponding position as the image being display on the display 151).

Figure 7D:
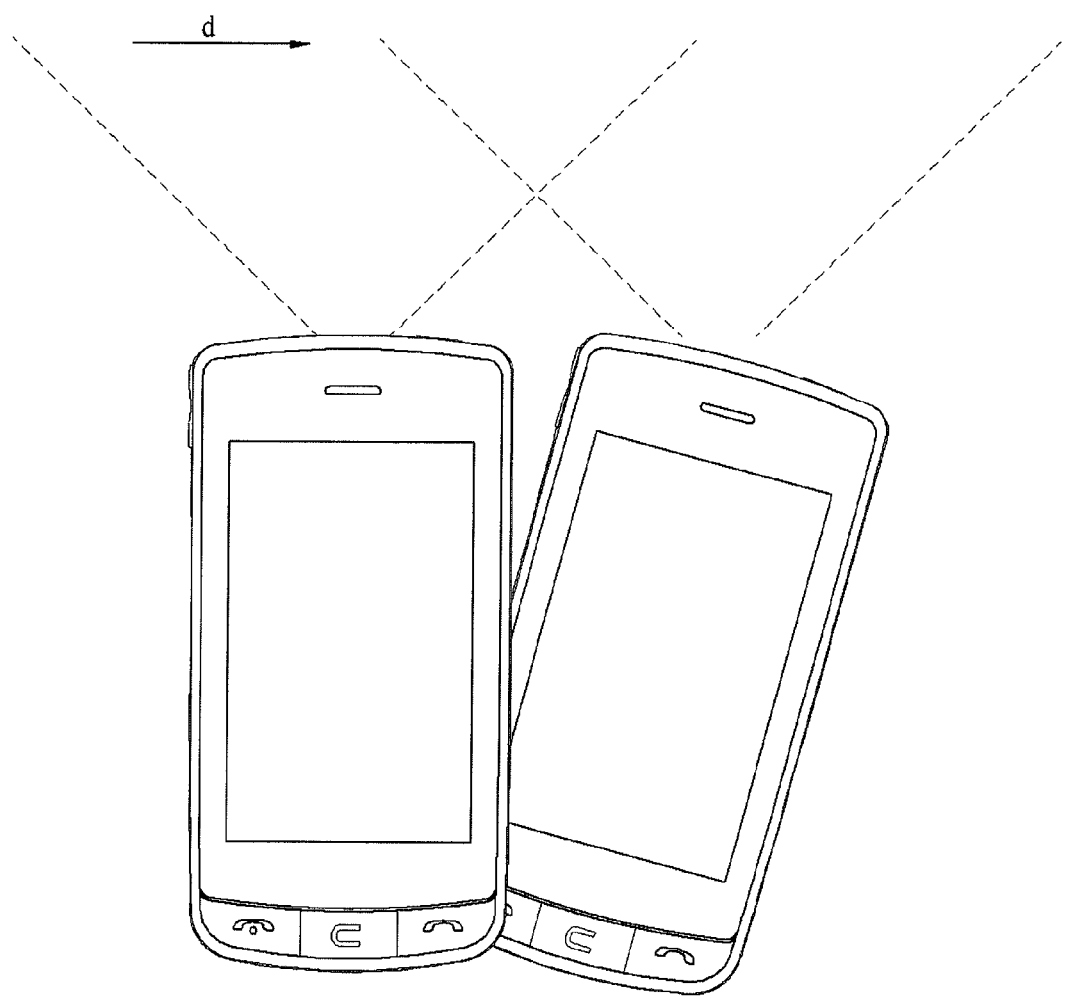
Figure 7E:
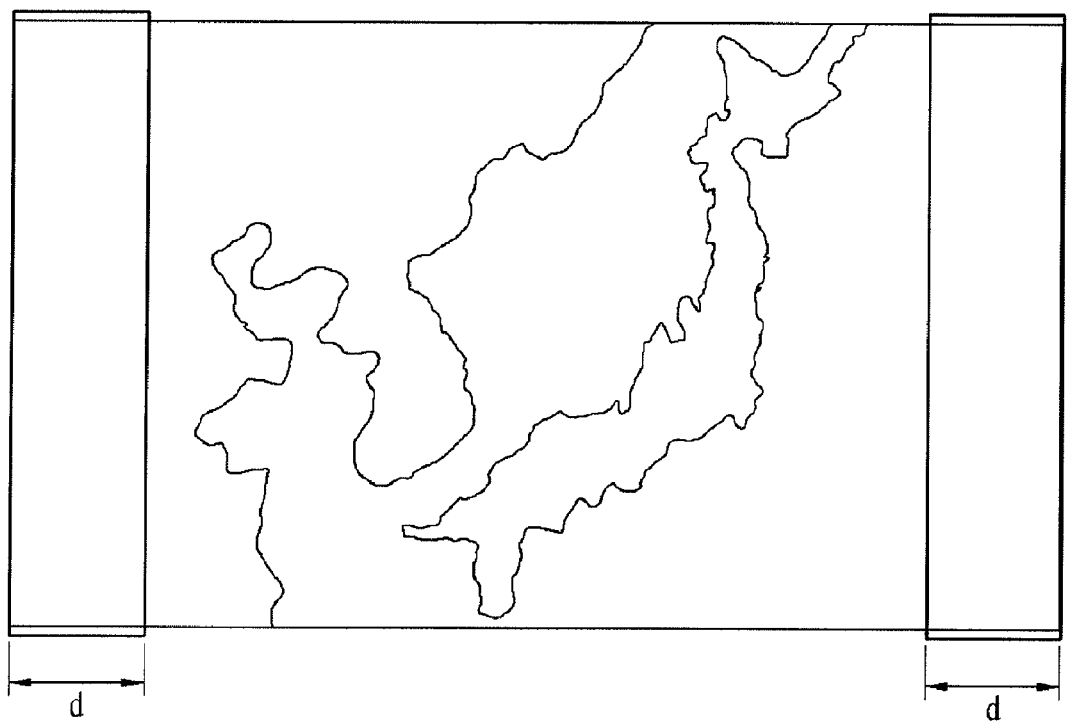
Figure 7F:
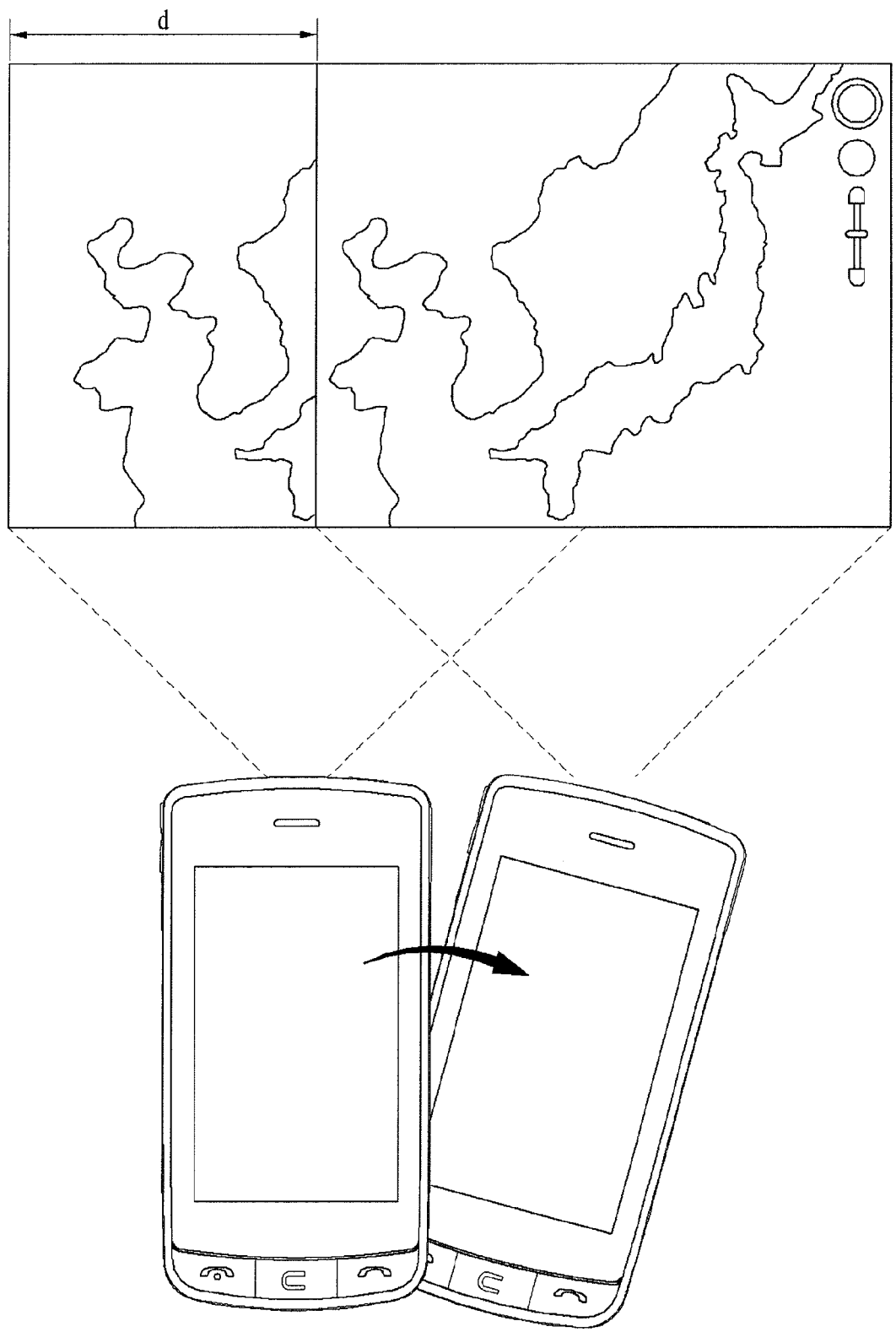

Therefore, the user can scroll the projected image by altering a motion of the terminal. For instance, as shown in FIG. 7D, if the user shifts the terminal by an amount 'd', the projected image is displayed in a manner of being shifted by 'd', or in an alternative example as shown in FIG. 7E, 'a predetermined multiple of the d'. Namely, the projected image is displayed in a manner of being shifted by 'd' or 'a predetermined multiple of the d' from an image currently displayed on a projection plane. For instance, the projected image is shifted as when a user moves or shifts a telescope when viewing a prescribed object through the telescope, the viewed scene changes by a shift distance or a multiple of the shift distance. In more detail, as shown in FIG. 7F, when the user moves the terminal, the data displayed on a projection plane is changed. In particular, when the user moves the terminal to the right, an area located at a right side of the currently displayed data is displayed together with the currently displayed data.

Therefore, as shown in FIGS. 7A-7F, the controller can calculate an amount of the movement (e.g., a direction and a distance of the movement), and use this information to move the projected image and/or display the scroll icon. Further, the controller 180 can first display the scroll icon based on the movement of the terminal, and then the user can touch or manipulate the scroll icon to move the projected image. In another embodiment, the controller 180 can directly move the projected image based on an amount of the movement of the terminal such that the user need only move the terminal to move the projected image and does not have to manipulate the scroll icon.

Further, in one embodiment of the present invention, the image is stabilized for smoothly connecting an image on a projection plane according to a motion of a terminal. In particular, the image is stabilized using an optical image stabilization or image sensor stabilization. In addition, the optical image stabilization is provided to correct an unstable image by varying a path of light, and the image sensor stabilization is provided to correct an unstable image by moving an image sensor. Various algorithms can be used for the image stabilization (e.g., image stabilization in photographing by a digital camera, etc.).

Thus, with reference to FIGS. 7A-7F, the projected display information can be only a portion of an entire display information, and the only portion of the entire display information projected onto the external surface is moved based on movement of the terminal or inputs on the scroll icon such that other portions of the entire display information are projected and viewable. Further, when the detected motion is in a horizontal direction, the only portion of the entire display information is moved in an opposite horizontal direction such that other portions of the entire display information that are horizontal to the only portion of the entire display information are projected and viewable.

Similarly, when the detected motion is in a vertical direction, the only portion of the entire display information is moved in an opposite vertical direction such that other portions of the entire display information that are vertical to the only portion of the entire display information are projected and viewable, and when the detected motion is in a diagonal direction, the only portion of the entire display information is moved in opposite direction such that other portions of the entire display information that are diagonal to the only portion of the entire display information are projected and viewable. In another embodiment, the projected display information includes a plurality of pages of display information, and each page of display information is paged through based on the detected motion.

Figure 8A:
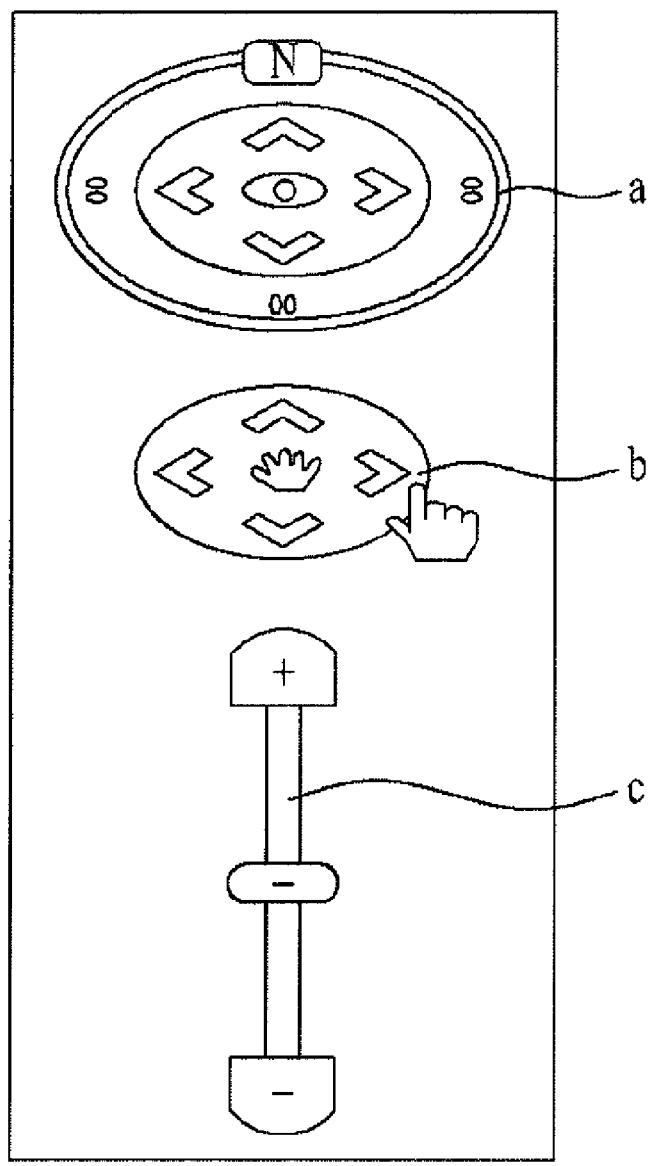
FIGS. 8A to 8D are diagrams illustrating a display area scrolling for a screen scroll operation in a mobile communication terminal according to an embodiment of the present invention.

Next, FIGS. 8A to 8D are diagrams illustrating a display area scroll icon for a screen scroll operation in a mobile communication terminal according to an embodiment of the present invention. Referring to FIG. 8A, the display area scroll icon D can contain a plurality of signs in the vertical direction of the display screen. For instance, 'a' indicates a direction navigation for a currently displayed image, 'b' indicates a screen navigation for a currently displayed image, and 'c' indicates a button for implementing an enlarge/reduce function of a currently displayed image.

In more detail, the direction navigation 'a' for an image displays a direction of an image when the terminal is moved in top, bottom, right, left or diagonal directions, while a specific key is pressed or after a specific point has been touched. Further, the screen navigation 'b' is used as a button to implement a screen scroll for a 2-dimensional motion top, bottom right or left directions. Also, the image enlarge/reduce button 'c' can be used to implement an enlarge/reduce function of a currently displayed image. Further, if a distance between the terminal and the projection plane is decreased, the image is enlarged, and if a distance between the terminal and the projection plane is increased, the image is reduced. Optionally, a display area scroll icon corresponding to a recognized direction of a motion of a terminal can be activated and displayed.

Figure 8B:
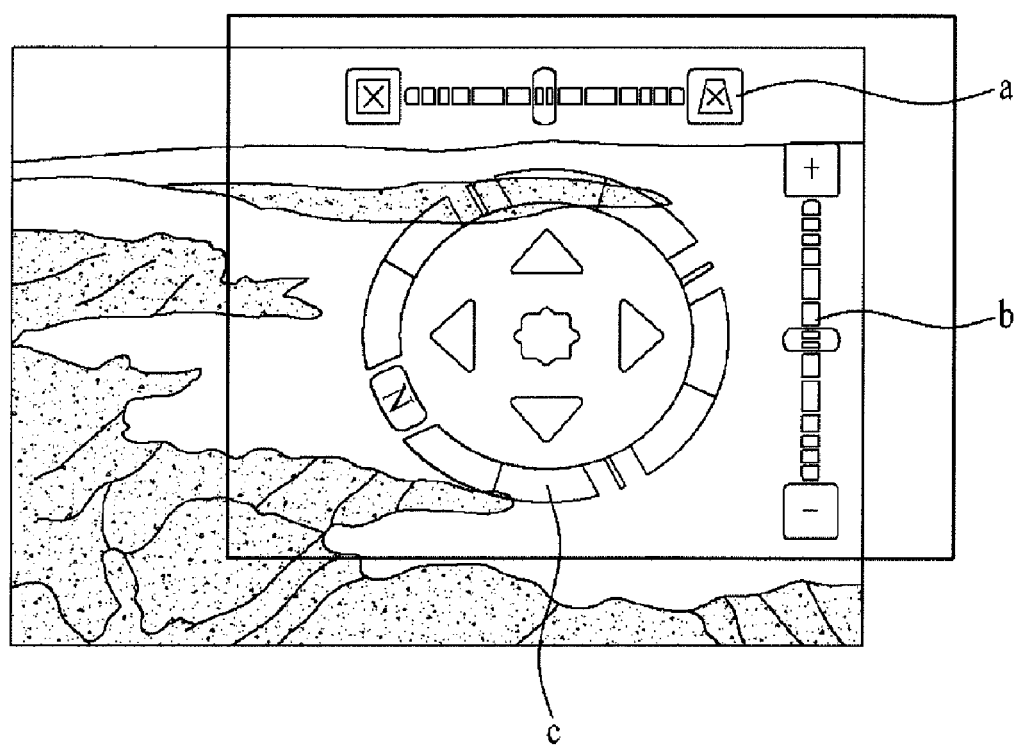

FIG. 8B illustrates another display area scroll icon. In FIG. 8B, 'a' is used to display a rotational action for a display screen. In particular, 'a' is used to implement a display screen corresponding to when a terminal is rotated by 360 degrees against a state in parallel with a gravitational direction of the terminal. Further, 'b' is used as a button for implementing an enlarge/reduce function of an image, and 'c' is used as a button for implementing a navigation function of a display screen.

Figure 8C:
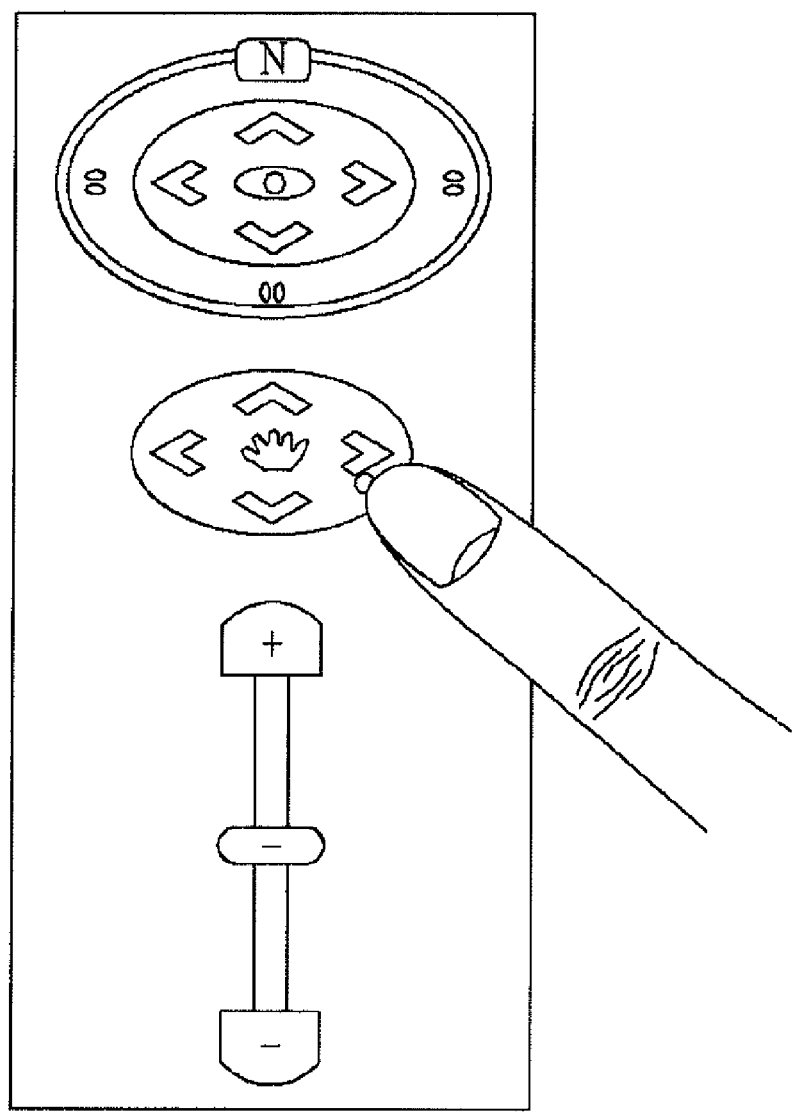
Figure 8D:
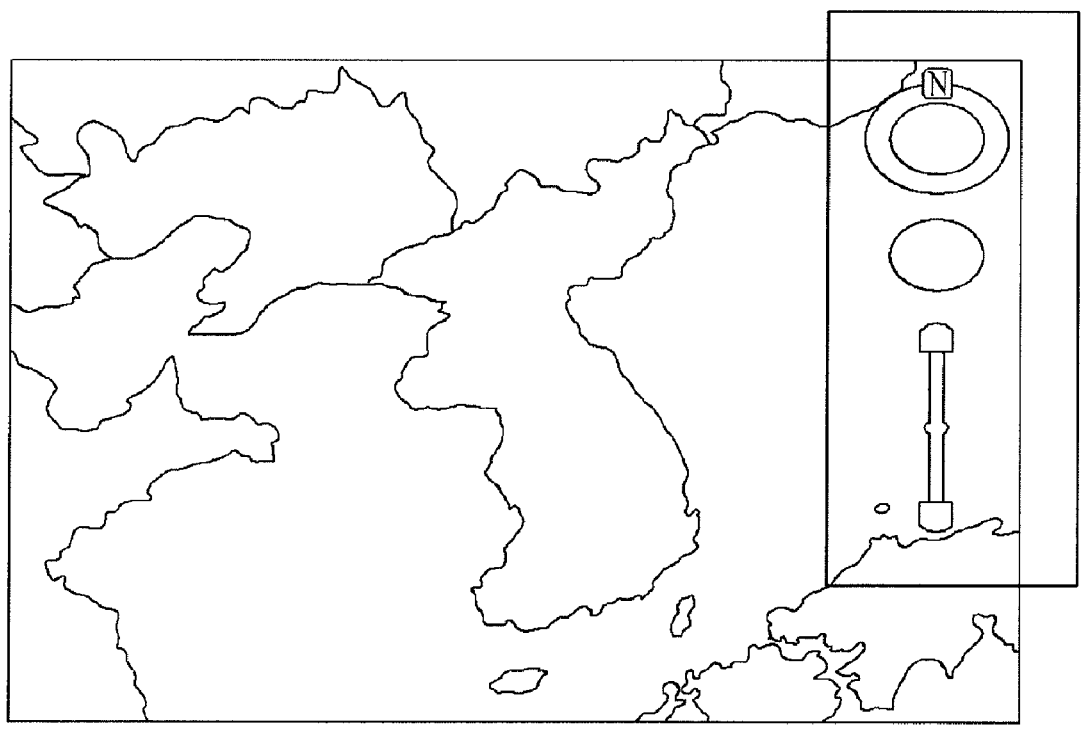

In addition, the display area scroll icon can be manipulated by the user performing a contact or proximity touch, as shown in FIG. 8C. Optionally, a specific function can be selected when a user shifts a pointer displayed on a screen using a navigation key included on the terminal. Further, the display area scroll icon D can be displayed as being fixed to a display screen. Thus, when the terminal is not moved, the display area scroll icon D can be hidden or moved to a side of the display screen, as shown in FIG. 8D. The icon can be partially displayed on the outside the main viewing area, can be completely hidden and only shown when the terminal is first moved, can be transparently displayed, etc. Thus, an automatic hide function can be implemented.

In addition, as discussed above, the display area scroll icon D can be displayed when the motion of the terminal is detected. Further, a specific display area scroll part corresponding to a motion recognized direction can be activated and displayed for a predetermined duration (e.g., 2 to 3 seconds). Then, if there is no further motion of the terminal after a lapse of the predetermined duration, the display area scroll icon D automatically disappears from the display screen.

The display area scroll icon can also be displayed on a specific portion of the display screen (e.g., a right top side of the display screen) in an overlapping manner or OSD (on screen display). Further, a pointer can be displayed together with the display area scroll icon, and can be displayed in various types of colors, shapes (e.g., arrow, ballpoint pen, fluorescent pen, laser icon, etc.) and the like. The user can also set the corresponding type of scroll icon.

Figure 9A:
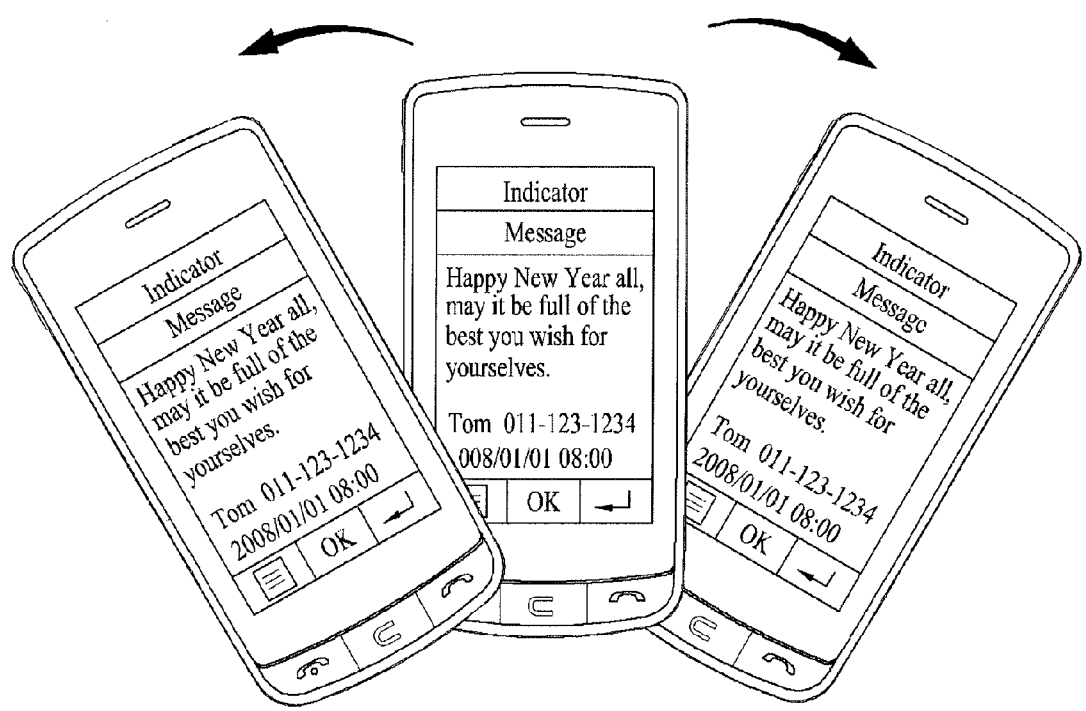
FIGS. 9A to 9C are diagrams illustrating various terminal motion patterns according to an embodiment of the present invention.
Figure 9B:
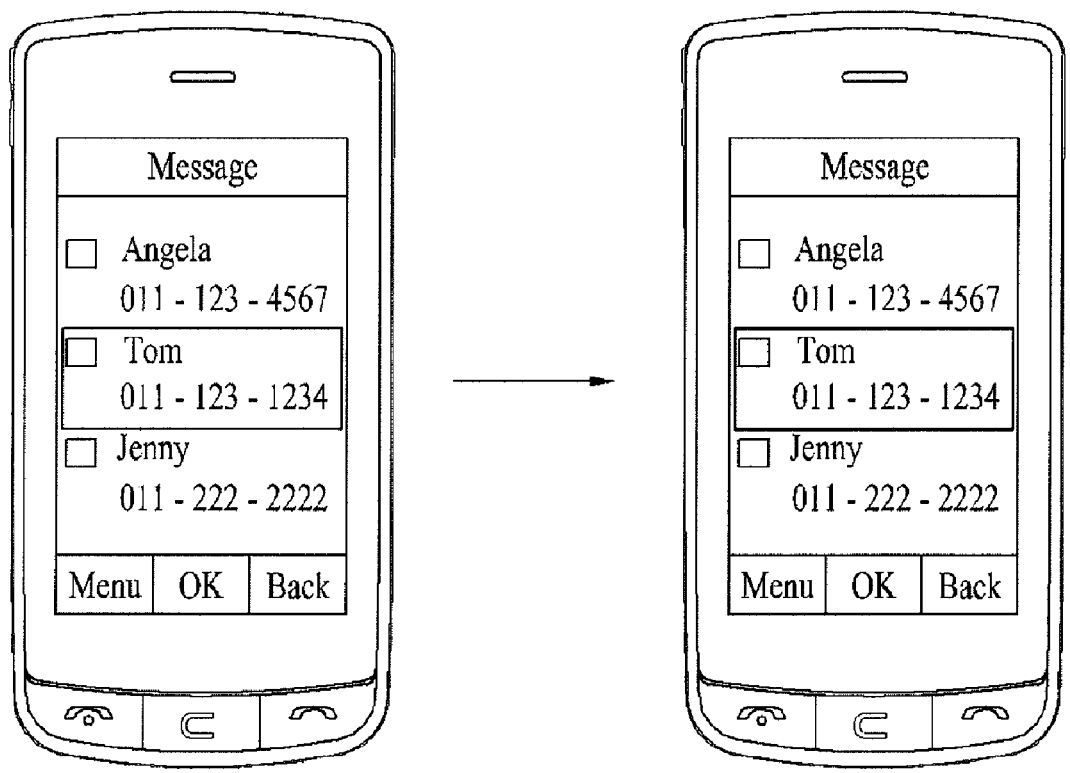
Figure 9C:
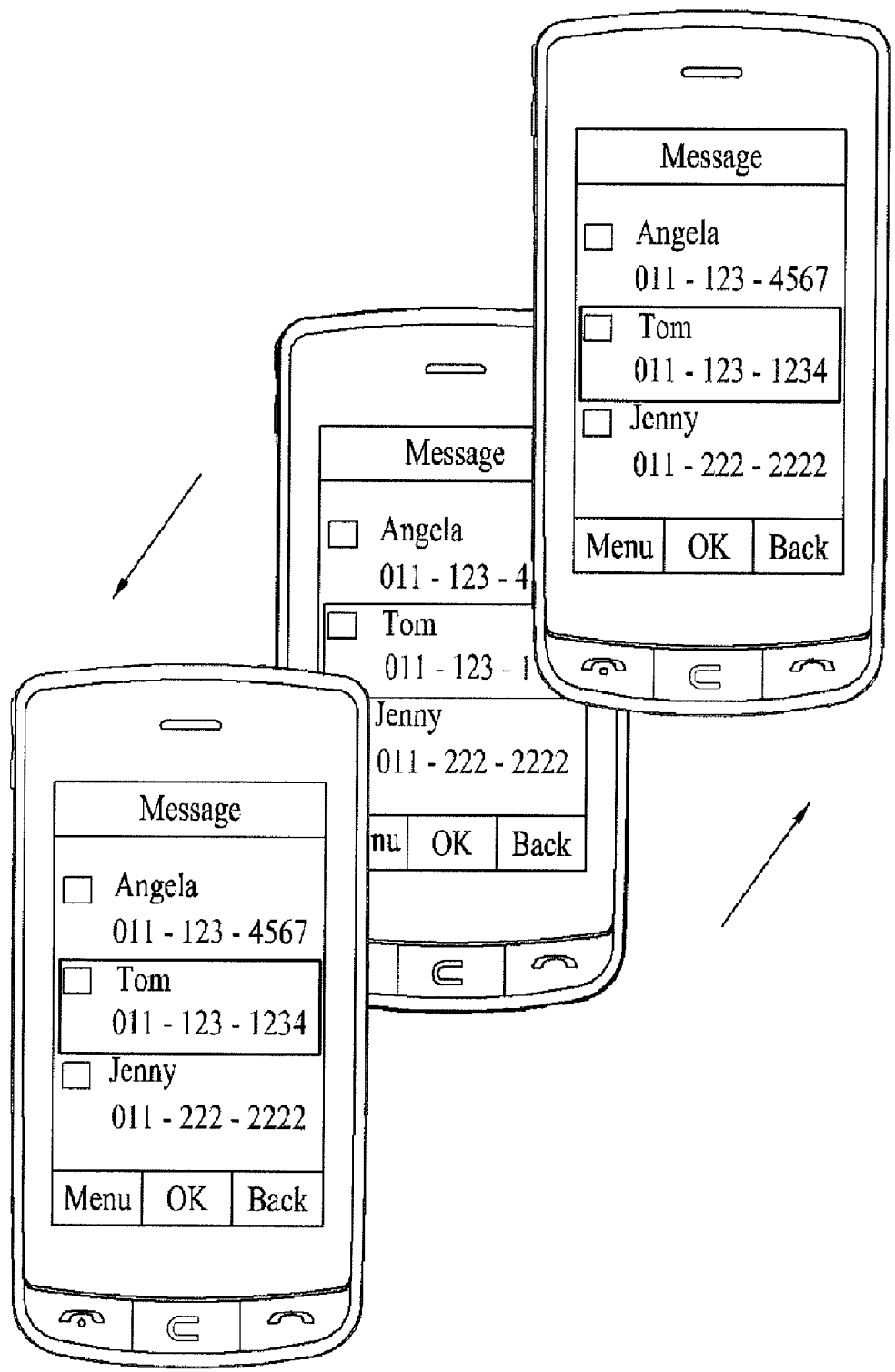

Next, FIGS. 9A to 9C are diagrams illustrating the mobile terminal being moved in various patterns and the displayed information being changed based on the movement of the terminal. In particular, as shown in FIG. 9A, the terminal is moved in left and right directions. Thus, the motion sensor included in the terminal according to embodiments of the present invention can recognize when the user moves the terminal in the left and right directions.

FIG. 9B illustrates the terminal being moved in a parallel horizontal direction. Thus, the motion sensor can recognize when the user moves the terminal in a parallel motion in a right or left direction on a plane. A similar concept applies to the user moving the terminal in a parallel up and down (vertical) manner. FIG. 9C illustrates the terminal being moved in a diagonal direction. Thus, the sensor can determine when the user moves the terminal in the diagonal direction (e.g., in a diagonal direction from a right top direction to a left bottom direction and the like). The sensor thus determines the moving pattern of the terminal and transmits this information to the controller 180. The controller 180 then controls the projector module 155 to shift, change or scroll the projected image based on the determined moving pattern.

Also, the scrolling mode can be automatically entered when the user places the terminal into the projector mode. In particular, the user can first turn on the projector module 155 to show his or her friend different pictures from a recent trip, for example. Thus, the projector module 155 projects the pictures onto an external surface such as a wall so the friends can view the pictures. The user can then move the terminal is particular patterns as discussed above to scroll, change, etc. the projected pictures. The scrolling feature can also be only turned on when the user manipulates or touches a particular portion of the terminal (e.g., a side key, a predetermined portion of the touch screen, etc.). Thus, the user can determine when the scrolling feature is turned on, rather than the scrolling feature being automatically turned on.

In addition, the above-described method can be implemented in a program recorded medium as computer-readable codes. The computer-readable media include ROM, RAM, CD-ROM, magnetic tapes, floppy discs, optical data storage devices, and the like for example and also include transmission via Internet.

Accordingly, embodiments of the present invention allow the user to smoothly scroll through projected images by moving the terminal in a predetermined pattern. The embodiments of the present invention also related to communication mobile terminals such as cell phones, and also relate to navigation terminals.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of scrolling projected display information of a mobile communication terminal, the method comprising:
   projecting display information via a projector module onto an external surface;
   detecting, via a sensor included in the terminal, a motion of the mobile communication terminal;
   calculating, via a controller, an amount of the detected motion of the mobile communication terminal; and
   moving, via the controller controlling the projector module, the display information projected onto the external surface based on the calculated amount of the detected motion,
   wherein the projected display information is only a portion of an entire display information and the detected motion is in one of a horizontal direction, a vertical direction and a diagonal direction,
   if the detected motion is in the horizontal direction, the moving step moves the portion of projected display information in an opposite horizontal direction such that other portions of the entire display information that are horizontal to the only portion of the entire display information are projected and viewable,
   if the detected motion is in the vertical direction, the moving step moves the projected display information in an opposite vertical direction such that other portions of the entire display information that are vertical to the only portion of the entire display information are projected and viewable, and if the detected motion is in the diagonal direction, the moving step moves the projected display information in an opposite diagonal direction such that other portions of the entire display information that are diagonal to the only portion of the entire display information are projected and viewable.

2. The method of claim 1, wherein the sensor includes at least one of a camera configured to detect a position shift of the projected display information, and a motion sensor configured to detect the motion of the mobile communication terminal.

3. The method of claim 1, further comprising:
displaying a scrolling icon on a display area of the mobile communication terminal that can be selected to scroll the projected display information.

4. The method of claim 3, wherein the displaying step displays the scrolling icon based on at least one of a predetermined manipulation of a key on the terminal, a predetermined touch pattern occurring on a touch screen of the display area, and a predetermined movement of the mobile communication terminal.

5. The method of claim 3, wherein the displaying step displays the scroll icon on the display area of the mobile communication terminal as one of a transparent scroll icon and an on screen display (OSD) scroll icon.

6. The method of claim 3, wherein the displayed scroll icon includes at least one of an image position navigation function that can be selected to navigate through the projected display information, an image enlarge/reduce function that can be selected to enlarge or reduce the projected display information, an image rotation function that can be selected to rotate the projected display information, and an image direction navigation function that can be selected to change a direction of the projected display information.

7. The method of claim 1, wherein the projected display information includes map information.

8. The method of claim 1,
wherein the moving step moves the projected display information such that other portions of the entire display information are projected and viewable.

9. The method of claim 1, wherein the projected display information includes a plurality of pages of display information, and
wherein the moving step pages through each page of display information based on the detected motion.

10. A mobile communication terminal, comprising:
a projector module configured to project display information onto an external surface;
a sensor configured to detect a motion of the mobile communication terminal; and
a controller configured to calculate an amount of the detected motion of the mobile communication terminal, and to control the projector module to move the display information projected onto the external surface based on the calculated amount of the detected motion,
wherein the projected display information is only a portion of an entire display information and the detected motion is in one of a horizontal direction, a vertical direction and a diagonal direction,
if the detected motion is in the horizontal direction, the controller is further configured to control the projector module to move the projected display information in an opposite horizontal direction such that other portions of the entire display information that are horizontal to the only portion of the entire display information are projected and viewable,
if the detected motion is in the vertical direction, the controller is further configured to control the projector module to move the projected display information in an opposite vertical direction such that other portions of the entire display information that are vertical to the only portion of the entire display information are projected and viewable, and
if the detected motion is in the diagonal direction, the controller is further configured to control the projector module to move the projected display information in an opposite diagonal direction such that other portions of the entire display information that are diagonal to the only portion of the entire display information are projected and viewable.

11. The mobile communication terminal of claim 10, wherein the sensor includes at least one of a camera configured to detect a position shift of the projected display information, and a motion sensor configured to detect the motion of the mobile communication terminal.

12. The mobile communication terminal of claim 10, further comprising:
a display configured to display a scrolling icon that can be selected to scroll the projected display information.

13. The mobile communication terminal of claim 12, wherein the display is further configured to display the scrolling icon based on at least one of a predetermined manipulation of a key on the terminal, a predetermined touch pattern occurring on a touch screen of the display, and a predetermined movement of the mobile communication terminal.

14. The mobile communication terminal of claim 12, wherein the display is further configured to display the scroll icon as one of a transparent scroll icon and an on screen display (OSD) scroll icon.

15. The mobile communication terminal of claim 12, wherein the displayed scroll icon includes at least one of an image position navigation function that can be selected to navigate through the projected display information, an image enlarge/reduce function that can be selected to enlarge or reduce the projected display information, an image rotation function that can be selected to rotate the projected display information, and an image direction navigation function that can be selected to change a direction of the projected display information.

16. The mobile communication terminal of claim 10, wherein the projected display information includes map information.

17. The mobile communication terminal of claim 10,
wherein the controller is further configured to control the projector module to move the projected display information such that other portions of the entire display information are projected and viewable.

18. The mobile communication terminal of claim 10, wherein the projected display information includes a plurality of pages of display information, and
wherein the controller is further configured to control the projector module to page through each page of display information based on the detected motion.

* * * * *